US008994809B2

(12) United States Patent
Liu et al.

(10) Patent No.: US 8,994,809 B2
(45) Date of Patent: Mar. 31, 2015

(54) METHOD AND APPARATUS FOR SIMULATING DEPTH OF FIELD (DOF) IN MICROSCOPY

(75) Inventors: Ming-Chang Liu, San Jose, CA (US); Mark Robertson, Cupertino, CA (US)

(73) Assignee: Sony Corporation, Tokyo (JP)

( * ) Notice: Subject to any disclaimer, the term of this patent is extended or adjusted under 35 U.S.C. 154(b) by 348 days.

(21) Appl. No.: 13/553,434

(22) Filed: Jul. 19, 2012

(65) Prior Publication Data

US 2014/0022347 A1 Jan. 23, 2014

(51) Int. Cl.
*H04N 5/253* (2006.01)
*G02B 21/36* (2006.01)

(52) U.S. Cl.
CPC .................... *G02B 21/367* (2013.01)
USPC .......................... 348/79; 382/255

(58) Field of Classification Search
USPC .............. 348/79, 80; 382/191, 255, 265, 264, 382/263
See application file for complete search history.

(56) References Cited

U.S. PATENT DOCUMENTS

| 5,986,659 | A | 11/1999 | Gallery et al. | |
|---|---|---|---|---|
| 7,477,794 | B2 | 1/2009 | Lefebvre et al. | |
| 2010/0254596 | A1* | 10/2010 | Xiong et al. | 382/159 |
| 2012/0281132 | A1* | 11/2012 | Ogura et al. | 348/348 |
| 2013/0293761 | A1* | 11/2013 | Guenter et al. | 348/345 |

FOREIGN PATENT DOCUMENTS

JP   2011150400 A   8/2011

OTHER PUBLICATIONS

Robertson, M. A. And Liu, M.-C., Method to Improve Depth of Field in Microscopy. Sony Invention Disclosure, IPD No. 3513. 2010.
Aguet, François, Van De Ville, Dimitri and Unser, Michael., "Model-Based 2.5-D Deconvolution for Extended Depth of Field in Brightfield Microscopy." IEEE Transactions on Image Processing, Jul. 2008, Issue 7, vol. 17, pp. 1144-1153.
Barsky, B. A. and Kosloff, T. J., "Algorithms for Rendering Depth of Field Effects in Computer Graphics." 2008. Proceedings of the 12th WSEAS International Conference on Circuits, Systems, Communications, and Computers. pp. 999-1010.
Kosloff, T. J., Tao, M. W. and Barsky, B. A., "Depth of Field Postprocessing For Layered Scenes Using Constant-Time Rectangle Spreading." 2009. ACM International Conference Proceeding Series. vol. 324 pp. 39-46.
Kosloff et al., "Depth of field post processing for layered scenes using constant-time rectangle spreading", Proceedings of graphics interface 2009, Canada, Canadian information processing Society, pp. 39-46, May 25, 2009.
Office Action Dated May 26, 2010, Japan Patent Application No. 2013-142661, 10 pages.

(Continued)

*Primary Examiner* — Michael Lee
(74) *Attorney, Agent, or Firm* — Moser Taboada

(57) ABSTRACT

A method and apparatus for simulating depth of field (DOF) in microscopic imaging, the method comprising computing a blur quantity for each pixel of an all-focus image, performing point spread function operations on one or more regions of the all-focus image, computing intermediate and normalized integral images on the regions and determining an output pixel for the each pixel based on the intermediate and normalized integral images.

15 Claims, 10 Drawing Sheets

(56) References Cited

OTHER PUBLICATIONS

Kosloff, Todd Jerome, et al., "Depth of Field Postprocessing for Layered Scenes Using Constant-Time Rectangle Spreading"; Electrical Engineering and Computer Sciences University of California at Berkeley; Dec. 30, 2008; Technical Report No. UCB/EECS/2008-187; Downloaded from website http://www.citeseer.uark.edu:8080/citeseerx/viewdoc/download?doi=10.1.1.154.4311&rep=rep1&type=pdf on Oct. 16, 2013, 10 pages.

Herbert, Paul S.; "Filtering by Repeated Integration"; vol. 20, No. 4, Aug. 1, 1986, pp. 315-321; Computer Graphics, ACM 0-89791-196-2/86/008/0315.

Kosloff, Todd Jerome; "Fast Image Filters for Depth-of-Field Post-Processing"; Electrical Engineering and Computer Sciences University of California at Berkeley; May 13, 2010; Technical Report No. UCB/EECS-2010-69; Downloaded from website http://search.proquest.com/docview/749078080 on Oct. 16, 2013; 90 pages.

European Search Report for Application No. 13174800.6-1562, dated Nov. 4, 2013, 9 pages.

\* cited by examiner

METHOD AND APPARATUS FOR SIMULATING DEPTH OF FIELD (DOF) IN MICROSCOPY

BACKGROUND

1. Field of the Invention

Embodiments of the present invention generally relate to managing images pertaining to digital microscopy and, more specifically, to a method and apparatus for simulating depth of field (DOF) in digital microscopy.

2. Description of the Related Art

A digital microscope images a specimen at different depths to create a sequence of digital images. Each image represents a portion of the specimen at a particular depth of focus. Thus, at a certain depth, only a fraction of the entire specimen is in focus. The sequence of digital images is stacked along a Z dimension corresponding to depth, referred to as a Z-stack. Each image in a Z-stack is focused at a different depth in the captured specimen. The Z-stack can also be simulated through the use of an all-focus image and a depth map of the specimen. The simulation offer a very low-bandwidth approximation to the original z-stack, while retaining the depth-dependent blurring and feel of the original data, and may help in various Z-stack data compression schemes.

Simulating DOF in microscopy poses numerous problems which are not fully addressed by the current technology. According to one attempt at simulating DOF, indirect use of the Z-stack is disclosed, by using a model for image formation as a spatially varying two-dimensional convolution with the system's point spread function (PSF), where the PSF is modeled using a Gaussian-shaped filter. However, in this approach, the computational complexity is high due to the spatially varying nature of the procedure. Complexity is further increased due to the large spatial support of the filters required to achieve a satisfactory out-of-focus blurring. Other conventional approaches generally require a trade-off between quality and complexity. In one such conventional approach, simulating DOF for artificial computer-generated scenes require the result to be of high graphical quality, which is achieved at the cost of high complexity.

Thus, there is a need for method and apparatus for simulating depth of field (DOF) in microscopy.

SUMMARY OF THE INVENTION

An apparatus and/or method for simulating depth of field (DOF) in microscopy, substantially as shown in and/or described in connection with at least one of the figures, as set forth more completely in the claims.

Various advantages, aspects and novel features of the present disclosure, as well as details of an illustrated embodiment thereof, will be more fully understood from the following description and drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present disclosure generally include apparatus and/or method for simulating depth of field (DOF) in microscopy, substantially as shown in and/or described in connection with at least one of the figures, as set forth more completely in the claims. According to an embodiment, the method for simulating DOF in microscopic imaging comprises approximating a sequence of images captured by a microscope using a depth map and an all-focus image. The sequence of images is in a Z-stack corresponding to the different focus depths. The embodiment further comprises approximating a Point Spread Function (PSF) of the microscope as a box function for each pixel of every image in the Z-stack. The contribution of each pixel of the all-focus image to a simulated Z-stack is a blurred version of the pixel of the all-focus image where the amount of blur is dependent on a depth difference.

Figure 1:
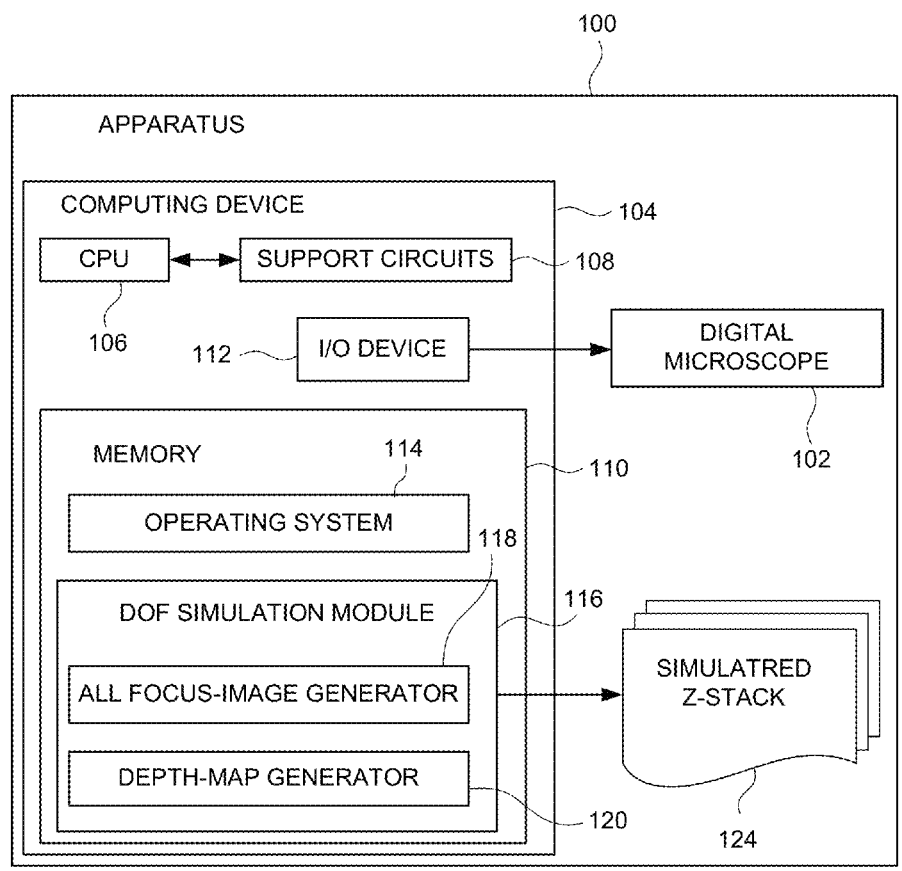
FIG. 1 depicts a block diagram of apparatus for simulating Depth of field (DOF) in microscopy, in accordance with exemplary embodiments of the present invention.

FIG. 1 depicts a block diagram of apparatus 100 for simulating depth of field (DOF) in microscopy, in accordance with exemplary embodiments of the present invention. The apparatus 100 comprises a digital microscope 102 and a computing device 104. In certain embodiments the digital microscope 102 is coupled to the computing device 104. In other embodiments, a stack of images is created by the microscope 102 and transferred to the computing device 104, e.g., via memory stick, compact disk, network connection or the like.

The digital microscope 102 captures digital images of a specimen at different depths for creating a sequence of images. The digital microscope 102 images the specimen at different depths to create the sequence of digital images. For purposes of illustration, the sequence of digital images is represented by following Expression A: I(x, y, z), where (x, y) is a spatial index with x=0 to X−1 and y=0 to Y−1 and z is a depth index with z=0 to Z−1 [Expression A].

The computing device 104 comprises a Central Processing Unit (or CPU) 106, support circuits 108, a memory 110 and an I/O device 112. The CPU 106 may comprise one or more commercially available microprocessors or microcontrollers that facilitate data processing and storage. The various support circuits 108 facilitate the operation of the CPU 106 and include one or more clock circuits, power supplies, cache, input/output circuits, and the like. The memory 110 comprises at least one of Read Only Memory (ROM), Random Access Memory (RAM), disk drive storage, optical storage, removable storage and/or the like. The memory 110 comprises an Operating System (OS) 114, a DOF simulation module 116. The DOF simulation module 116 simulates the sequence of images of a specimen captured using the digital microscope 102. The DOF simulation module 116 comprises an all focus-image generator 118 and a depth-map generator 120. The all focus-image generator 118 generates an all focus-image in accordance with the principles of the invention.

As used herein, the term "all-focus image" refers to the reduction of a Z-stack of a sequence of images of a specimen on a slide from three dimensions to two dimensions such that the result contains the entire specimen in focus. The all-focus image is formed by weighting each image according to a particular measure and combining the weighted images accordingly, as described in commonly assigned U.S. Patent Application Attorney Docket #201003513.01, hereby incorporated by reference in its entirety.

The all-focus image is a composite of portions of the images in the Z-stack that are in focus at each focus depth without the out-of-focus blur. The all-focus image is represented by following Expression B: $I_\infty(x, y)$ [Expression. B]

In order to determine the all-focus image, the depth-map generator 120 calculates the depth at each pixel to generate a depth map to indicate which image of the Z-stack has the best focus at that pixel. The depth-map is represented by following Expression C: d(x, y) [Expression C]. The depth map d(x,y) indicates which of the images in the Z-stack is most in-focus at each position (x,y).

In operation, the computing device 104 executes the DOF simulation module 116. The DOF simulation module 116 facilitates implementation of one or more methods for approximating the sequence of images captured by the microscope 102 using the depth map and the all-focus image.

Figure 2:
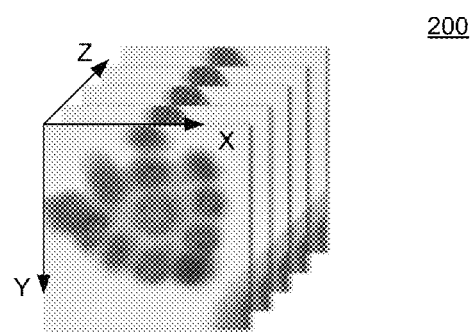
FIG. 2 depicts an example Z-stack, in accordance with exemplary embodiments of the present invention.

FIG. 2 depicts an example Z-stack 200 generated by the digital microscope 102. Each image in the Z-stack 200 is focused at a different depth in the specimen. The digital microscope 102 captures digital images of a specimen at different focus depths to create a sequence of images. Thus, focus depth is incremented as the specimen is viewed to capture differing portions of the specimen in focus. The sequence of digital images is stacked along the Z dimension corresponding to depth, so that for each focus depth there is an associated image in the Z-stack with a portion of the specimen in focus.

Figure 3:
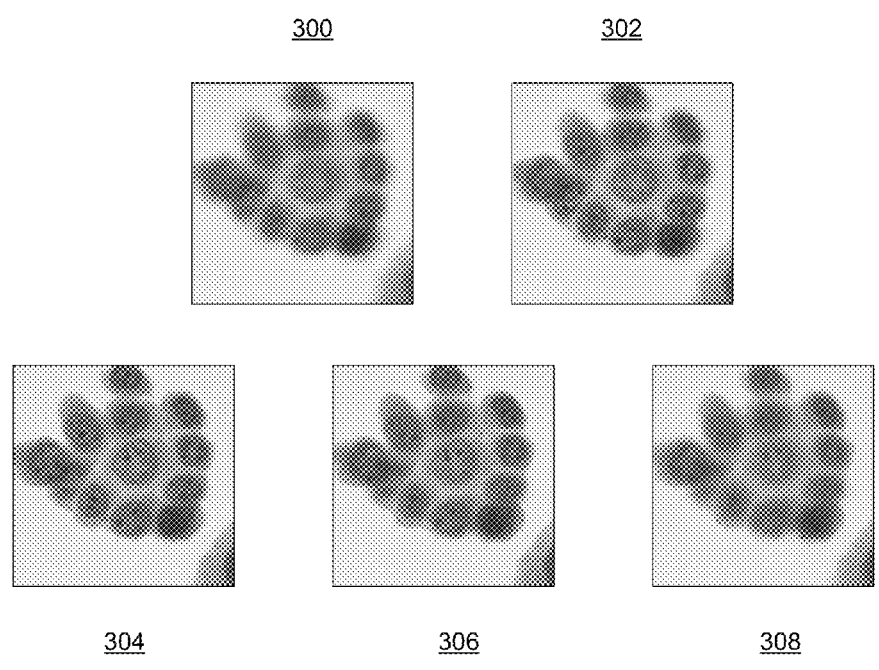
FIG. 3 depicts five individual images from the Z-stack of FIG. 2, in accordance with exemplary embodiments of the present invention.

FIG. 3 depicts five individual images of the Z-stack 200 shown in FIG. 2, in accordance with exemplary embodiments of the present invention. FIG. 3 illustrates images 302, 304, 306, 308 and 310, each at different Z depths. For example, when a user of a digital microscope initially views a slide of a specimen, image 302 appears. If the user wishes to adjust the focus to a different Z depth, image 304 appears, and so on, forming the Z-stack 200 shown in FIG. 2.

Figure 4:
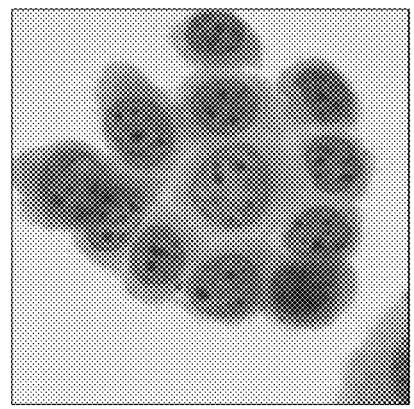
FIG. 4 depicts examples of an all-focus image and a depth-map for the Z-stack and images shown in FIGS. 2 and 3, in accordance with exemplary embodiments of the present invention.
Figure 4:
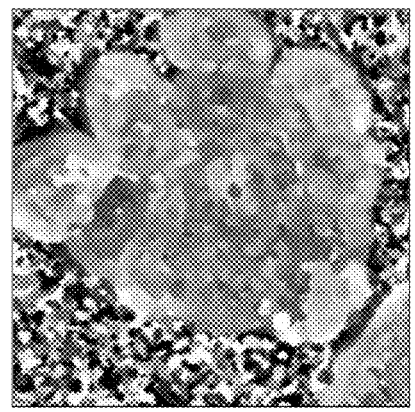

In some applications, there are a large number of images in the Z-stack, for example 15, 30, or 50. This imposes high bandwidth requirements for the storage or transmission of the S-stack. FIG. 4 shows example results of processing according to some embodiments of this invention for producing a depth map. The original data set, i.e. Z-stack, contains, for example, 50 images, several of which are shown in FIGS. 2 and 3. In the FIG. 4, image 402 is the all-focus image, and the image 404 is a depth-map computed to indicate which image of the z-stack had the best focus at a particular pixel. The depth map enables the DOF simulation module 116 to determine which Z-stack image to display for a particular pixel or region of an image of a specimen.

Figure 5:
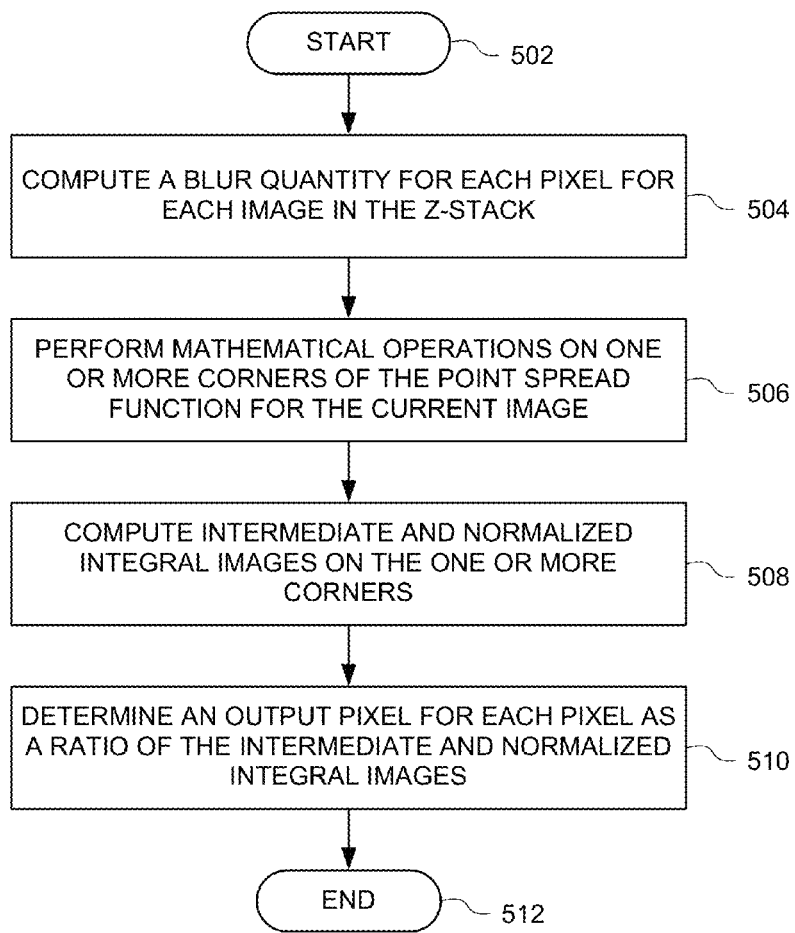
FIG. 5 depicts a flow diagram of a method for simulating DOF in microscopy, in accordance with exemplary embodiments of the present invention.

FIG. 5 is a flow diagram of a method 500 for simulating DOF in microscopy, as performed by the DOF simulation module 116 of FIG. 1, in accordance with exemplary embodiments of the present invention.

The method 500 is an implementation of the DOF simulation module 116 executed by the CPU 106. The DOF simulation module 116 comprises an all-focus image generator 118 and a depth-map generator 120.

The method begins at step 502 and proceeds to step 504. At step 504, the DOF simulation module 116 computes a blur quantity for each pixel in each image in the Z-stack. According to an exemplary embodiment, the blur quantity is computed as $\sigma = \eta_0 + \eta_1 |d(x,y) - z|$ where the parameters $\eta_0$ and $\eta_1$ are determined according to the optical properties of the system, although it is also possible to estimate them directly from the z-stack. The expression $|d(x,y) - z|$ represents the depth difference of a particular image in the Z-stack calculated by the depth map generator 120.

The method then proceeds to step 506 where mathematical operations are performed on one or more corners of the point spread function (PSF) for each image in the Z-stack. The point spread function (PSF) describes the imaging system response to a point input, and is analogous to the impulse response. The method describe below is referred to as the "BOX PSF" method. The BOX PSF method approximates, i.e. simulates, the PSF of the digital microscope 102 as a box function. In the BOX PSF method, the PSF is a box function of constant height $1/\sigma^2$ with spatial support of size $\sigma * \sigma$.

The DOF simulation module 116 facilitates performance of the following four pairs of operations for four pairs of distinct positions, namely top-left, top-right, bottom-left and bottom-right, represented by corresponding four pair of Equations According to one embodiment, the mathematical operation for the top-left position calculated as:

$$H(x - \{\tfrac{\sigma}{2}\}, y - \{\tfrac{\sigma}{2}\}) \mathrel{+}= \tfrac{1}{\sigma^2} I_\infty(x, y)$$
$$\text{and}$$
$$T(x - \{\tfrac{\sigma}{2}\}, y - \{\tfrac{\sigma}{2}\}) \mathrel{+}= \tfrac{1}{\sigma^2};$$

for the top-right position $$H(x + \{\tfrac{\sigma}{2}\} + 1, y - \{\tfrac{\sigma}{2}\}) \mathrel{-}= \tfrac{1}{\sigma^2} I_\infty(x, y)$$
$$\text{and}$$
$$T(x + \{\tfrac{\sigma}{2}\} + 1, y - \{\tfrac{\sigma}{2}\}) \mathrel{-}= \tfrac{1}{\sigma^2};$$

for the bottom-left position:

$$H\left(x-\left\{\frac{\sigma}{2}\right\}, y+\left\{\frac{\sigma}{2}\right\}+1\right) -= \frac{1}{\sigma^2} I_\infty(x, y)$$

and $$T\left(x-\left\{\frac{\sigma}{2}\right\}, y+\left\{\frac{\sigma}{2}\right\}+1\right) -= \frac{1}{\sigma^2};$$

and for the bottom right position:

$$H\left(x+\left\{\frac{\sigma}{2}\right\}+1, y+\left\{\frac{\sigma}{2}\right\}+1\right) += \frac{1}{\sigma^2} I_\infty(x, y)$$

and $$T\left(x+\left\{\frac{\sigma}{2}\right\}+1, y+\left\{\frac{\sigma}{2}\right\}+1\right) += \frac{1}{\sigma^2}.$$

Those of ordinary skill in the art will appreciate that expressions in the form of "F(x)+=C" and the "F(x)-=C" expand to "F(x)=F(x)+C" and "F(x)=F(x)-C" correspondingly, as applied to the expressions shown above.

The method then proceeds to step 508, where intermediate and normalized integral images are computed based on the performed mathematical operations. An integral image (also known as a summed area table) is used by each of the three methods for simulating z-stacks. "Summed area table" or integral image refers to an algorithm for quickly and efficiently generating the sum of values in a rectangular subset of a grid. The summed area table is very well known in the study of multi-dimensional probability distribution functions, namely in computing 2-D or N-Dimensional (N-D) probabilities (i.e. area under the probability distribution) from the respective cumulative distribution functions.

For image I(x, y), the integral image $W_I(x,y)$ is defined as $W_I(x,y)=\Sigma_{m=0}^y \Sigma_{n=0}^x I(n,m)$. According to an exemplary embodiment, the integral image is calculated recursively:

$$W_I(0,0)=I(0,0)$$

$$W_I(x,0)=I(x,0)+W_I(x-1,0), x=1,\ldots,X-1$$

$$W_I(0,y)=I(0,y)+W_I(0,y-1), y=1,\ldots,Y-1$$

$$W_I(x,y)=I(x,y)+W_I(x-1,y)+W_I(x,y-1)-W(x-1,y-1),$$
$$x\neq 0, y\neq 0$$

Those of ordinary skill will appreciate that there are many other methods of computing the integral image and the method shown above is not intended to be a limitation to the invention in any way. At step 508, the method computes $G(x,y)=W_H(x,y)$, the integral image of H(x,y) and computes $S(x,y)=W_T(x,y)$, the integral image of T(x, y).

The method 500 then proceeds to step 510, where an output pixel is determined for each input pixel. According to an exemplary embodiment, the output pixel is determined as a ratio between the intermediate integral image and the normalized integral image determined in step 508, i.e.:

$$I_z(x, y) = \frac{G(x, y)}{S(x, y)}$$

at each pixel. Thus the output pixels are obtained. The method then ends at step 512.

Figure 6:
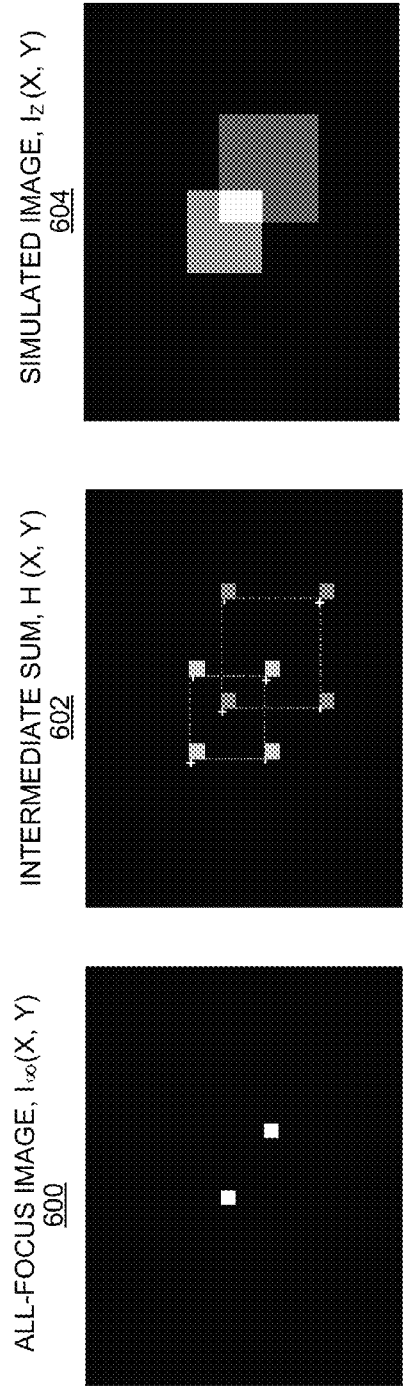
FIG. 6 depicts an illustration of the method of summing for a box shaped point spread function (PSF), in accordance with exemplary embodiments of the present invention.

FIG. 6 is an illustration of the BOX PSF method for PSF summing for a box shaped PSF. The image 600 is an all-focus image and the image 604 is a simulated image. For the image 602, only the four corners of the intermediate sum are processed, and after the PSFs for all pixels are included, the integral image transforms the intermediate sums, such that the desired PSF effect is achieved.

It must be noted that for color image data, there are three separate accumulations, i.e. sums, for three distinct channels, namely red, green and blue. For purposes of clarity and expediency, the three accumulations are represented for red, green and blue are represented by following three Expressions, namely D, E and F: $H_r(n, m)$ [Expression D], $H_g(n, m)$ [Expression E] and $H_b(n, m)$ [Expression F], respectively. But, for color image data, there is only one accumulation for normalization represented by Expression G: T (n, m) [Expression G].

To prevent artificial changes in focus, the impulse-like operations that are applied to each corner are instead spread out across several locations according to the actual value of σ (blur), which ensures smooth transitions among the PSFs as a user navigates a Z-stack and prevents artifacts.

In certain embodiments, spreading of the corner operations with bilinear interpolation in accordance with the fractional part of {σ/2} is implemented by the DOF simulation module 116. It must be noted that the effect is to soften (i.e. smooth) the edges of the PSF in the simulated image.

Figure 7:
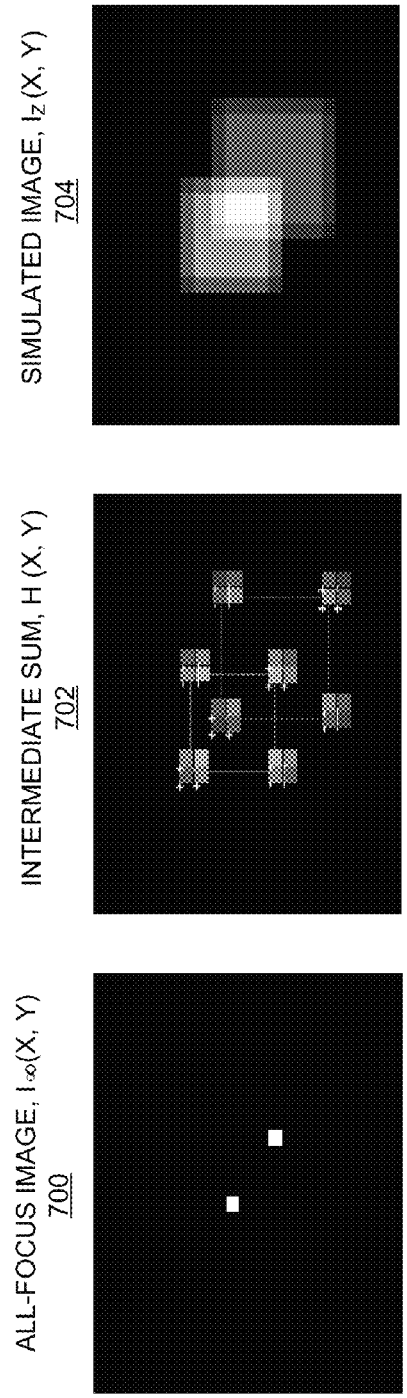
FIG. 7 depicts example results of the BOX PSF method, in accordance with exemplary embodiments of the present invention.

FIG. 7 is an illustration of spreading the individual corner operations across four positions at each corner. The image 700 shows two bright pixels in the all-focus image. The image 702 shows that, at each corner position, the single corner operation as illustrated in FIG. 6, is spread across four positions according to the fractional part of {σ/2}. The image 704 shows that after computing the integral image, the effect is the same as shown in FIG. 6, but the box-shaped PSFs are smoothened at the edges, according to the fractional part of {σ/2}.

Figure 8:
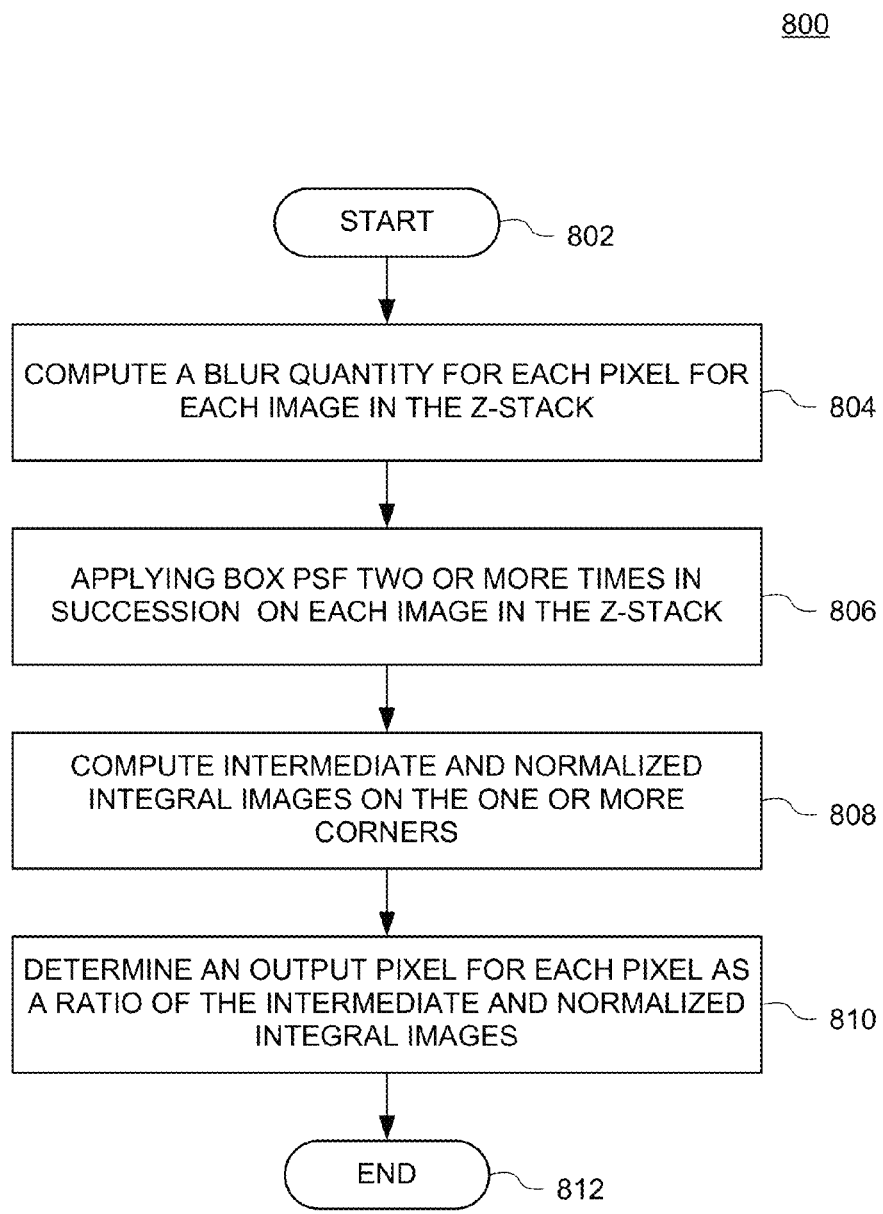
FIG. 8 depicts a method 800 for simulating DOF using an iterated BOX PSF, in accordance with exemplary embodiments of the present invention.

FIG. 8 depicts a method 800 for simulating DOF using an iterated BOX PSF method 800 is an exemplary implementation of the DOF simulation module 116 as executed by the CPU 106.

The method begins at step 802 and proceeds to step 804. At step 804, the DOF simulation module 116 computes a blur quantity for each pixel in each image in the Z-stack. According to an exemplary embodiment, the blur quantity is computed as $\sigma=\eta_0+\eta_1|d(x,y)-z|$ where the parameters $\eta_0$ and $\eta_1$ are determined according to the optical properties of the system, although it is also possible to estimate them directly from the z-stack and |d(x,y)-z| represents the depth difference of a particular image in the Z-stack.

The method then proceeds to step 806 where mathematical operations are performed on one or more corners of the iterated point spread function (PSF) for each image in the Z-stack.

The iterated BOX PSF method implements the BOX PSF method in one or more iterations. For example, the iterated box PSF method achieves a modified PSF by applying the BOX PSF method twice in succession. The effect of iterated BOX PSF method is similar to explicitly implementing a PSF of a triangular function. It must be noted that, applying a filter twice is equivalent to applying a composite filter once, where the composite filter is the convolution of the original filter with itself. Thus, the iterated BOX PSF method achieves a modified PSF by applying the BOX PSF method twice in succession. In certain specific embodiments, the box filter convolved with itself is a triangle filter. Applying the BOX PSF method twice to achieve an effect similar to that of a triangular filter improves filter quality while increasing complexity, relative to application of the BOX PSF method a single time. In certain embodiments, the iterated BOX PSF is extended further by iterating the box filter from the BOX PSF method an arbitrary number of times to achieve smoother effective PSFs.

The method then proceeds to step 808, where intermediate and normalized integral images are computed based on the performed mathematical operations. An integral image (also known as a summed area table) is used by each of the three methods for simulating z-stacks. The method 800 then proceeds to step 810, where an output pixel is determined for each input pixel. According to an exemplary embodiment, the output pixel is determined as a ratio between the intermediate integral image and the normalized integral image determined in step 808, i.e.:

$$I_z(x, y) = \frac{G(x, y)}{S(x, y)}$$

at each pixel. The method then ends at step 812.

Figure 9:
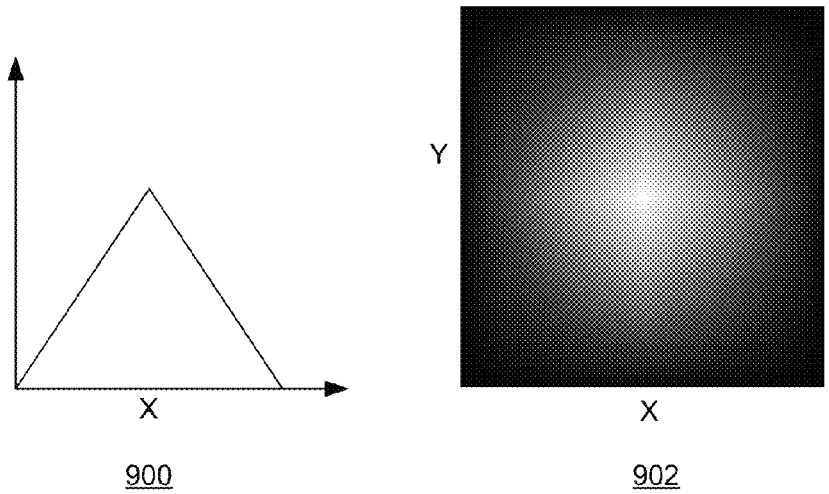
FIG. 9 depicts PSFs for a triangle filter for both 1 dimensional and 2 dimensional cases, in accordance with exemplary embodiments of the present invention.

FIG. 9 depicts one or more PSF for a triangle filter, for both 1D (900) and the 2D case (902).

In certain embodiments, the DOF simulation module 116 implements a third method for simulating DOF. For purposes of clarity and expediency, the third method for simulating DOF is referred to as triangle PSF method. Unlike the triangle PSF method, the iterated BOX PSF method achieves the effect similar to the triangle PSF method by applying the BOX PSF method twice.

Figure 10:
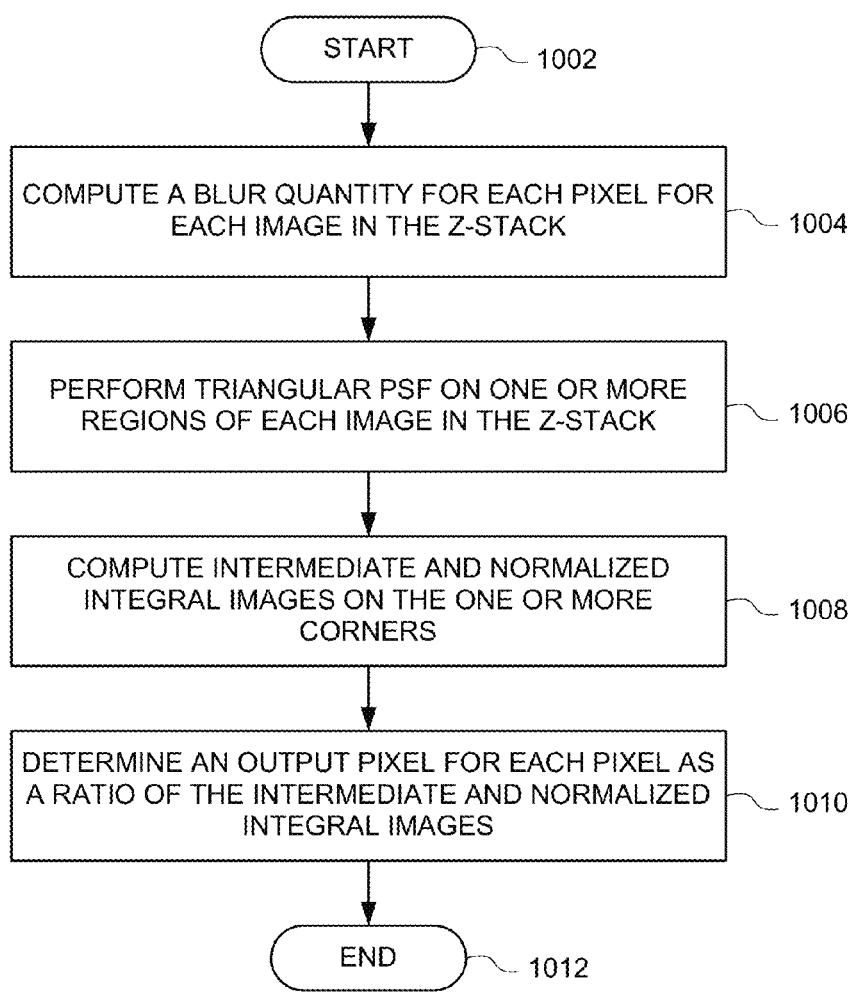
FIG. 10 depicts a flow diagram of a method 1000 for simulating DOF using a triangle PSF, in accordance with exemplary embodiments of the present invention.

FIG. 10 depicts a flow diagram of an alternative method 1000 for simulating DOF using a triangle PSF instead of a BOX PSF. Method 1000 is an exemplary implementation of the DOF simulation module 116 as executed by the CPU 106.

The method begins at step 1002 and proceeds to step 1004. At step 1004, the DOF simulation module 116 computes a blur quantity for each pixel in each image in the Z-stack. According to an exemplary embodiment, the blur quantity is computed as $\sigma = \eta_0 + \eta_1 |d(x,y)-z|$ where the parameters $\eta_0$ and $\eta_1$ are determined according to the optical properties of the system, although it is also possible to estimate them directly from the z-stack and $|d(x,y)-z|$ represents the depth difference of a particular image in the Z-stack.

The method then proceeds to step 1006 where mathematical operations are performed on one or more corners of the iterated point spread function (PSF) for each image in the Z-stack.

At step 1006, the DOF simulation module 116 facilitates performance of the following nine pair of operations for nine pairs of distinct positions, namely top-left, top-center, top-right, middle-left, middle-center, middle-right, bottom-left, bottom-center and bottom-right, represented by corresponding nine pair of Equations, namely 5(a) and 5(b); 6(a) and 6(b); 7(a) and 7(b); 8(a) and 8(b); 9(a) and 9(b); 10(a) and 10(b); 11(a) and 11(b); 12(a) and 12(b); and 13(a) and 13(b), respectively. $H(x-\{\sigma\}, y-\{\sigma\})+=1/\sigma^4 I_\infty(x, y)$ and $T(x-\{\sigma\}, y-\{\sigma\})+=1/\sigma^4$ [Equations 5(a) and 5(b)]; $H(x+1, y-\{\sigma\})-=2/\sigma^4 I_\infty(x, y)$ and $T(x+1, y-\{\sigma\})-=2/\sigma^4$ [Equations 6(a) and 6(b)]; $H(x+\{\sigma\}+2, y-\{\sigma\})+=1/\sigma^4 I_\infty(x, y)$ and $T(x+\{\sigma\}+2, y-\{\sigma\})+=1/\sigma^4$ [Equations 7(a) and 7(b)]; $H(x-\{\sigma\}, y+1)-=2/\sigma^4 I_\infty(x, y)$ and $T(x-\{\sigma\}, y+1)-=2/\sigma^4$ [Equations 8(a) and 8(b)]; $H(x+1, y+1)+=4/\sigma^4 I_\infty(x, y)$ and $T(x+1, y+1)+=4/\sigma^4$ [Equations 9(a) and 9(b)]; $H(x+\{\sigma\}+2, y+1)-=2/\sigma^4 I_\infty(x, y)$ and $T(x+\{\sigma\}+2, y+1)-=2/\sigma^4$ [Equations 10(a) and 10(b)]; $H(x-\{\sigma\}, y+\{\sigma\}+2)+=1/\sigma^4 I_\infty(x, y)$ and $T(x-\{\sigma\}, y+\{\sigma\}+2)+=1/\sigma^4$ [Equations 11(a) and 11(b)]; $H(x+1, y+\{\sigma\}+2)-=2/\sigma^4 I_\infty(x, y)$ and $T(x+1, y+\{\sigma\}+2)-=2/\sigma^4$ [Equations 12(a) and 12(b)] and $H(x+\{\sigma\}+2, y+\{\sigma\}+2)+=1/\sigma^4 I_\infty(x, y)$ and $T(x+\{\sigma\}+2, y+\{\sigma\}+2)+=1/\sigma^4$ [Expression 13(a) and 13(b)].

At step 1008, the DOF simulation module 116 facilitates computation of a third function for the intermediate integral image represented by following Expression 17: $G_1(x, y)=W_H(x, y)$, [Expression 17] where G is the third function and $W_H(x, y)$ is the integral image of intermediate sum. The DOF simulation module 116 facilitates computation of a fourth function represented by following Expression 18: $G(x, y)=W_{G1}(x, y)$, [Expression 18] where G is the fourth function and $W_{G1}(x, y)$ is the integral image of the third function. The DOF simulation module 116 facilitates computation of a fifth function represented by following Expression 19: $S_1(x, y)=W_T(x, y)$, [Expression 19] where $S_1$ is the fifth function and $W_T(x, y)$ is the integral image of normalized sum. The DOF simulation module 116 facilitates computation of a sixth function represented by following Expression 20: $S(x, y)=W_{S1}(x, y)$, [Expression 20] where S is the sixth function and $W_{S1}(x, y)$ is the integral image of the fifth function. At step 1010, the DOF simulation module 116 facilitates computation of an output pixel for each input pixel as the ratio of the fourth is to the sixth function, which represents the simulated Z-stack. Like the box PSF method, the triangular PSF method only operates on a few pixel positions, instead of operating over the entire support of the filter. In the box PSF method, four positions are used, while in the case the triangular PSF method nine positions are used. The method then ends at step 1012.

Figure 11:
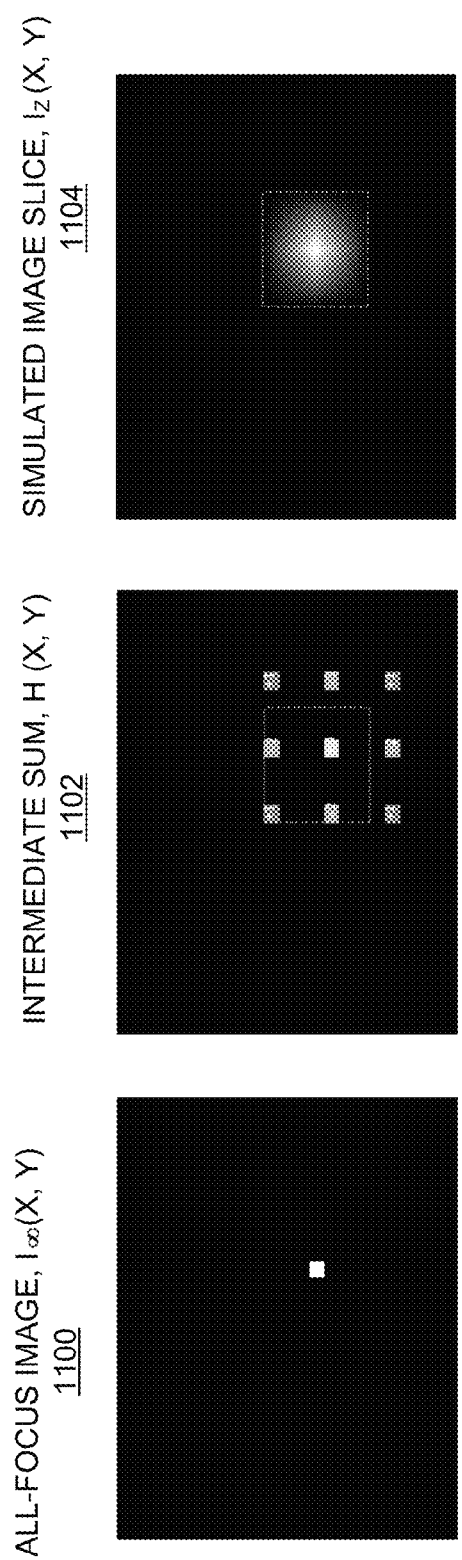
FIG. 11 depicts an illustration of a third method of PSF summing for a triangle-based PSF, in accordance with exemplary embodiments of the present invention.

FIG. 11 is an illustration of the third method of PSF summing for a triangle-based PSF implemented in method 1000. In FIG. 11, only a single PSF instead of two overlapping PSFs are shown for clarity in image 1100. In certain embodiments, similar to the BOX PSF method that spreads corner contributions to multiple positions, as shown in FIG. 7, the triangular BOX PSF method spreads spread each of the nine contributions to multiple positions.

In FIG. 11, the image 1100 shows one bright pixel in the all-focus image, whereas the image 1102 shows the nine positions identified in the triangular BOX PSF method, which correspond to the triangle PSF, in which the PSF spatial support is indicated with dotted lines. Further, the image 1104 shows that after computing the integral image twice, the overall PSF contribution to the final simulated image of the z-stack is a 2-D triangle function. In the image 1104, although only a single pixel is shown from the all-focus image 1100, in general each pixel of the all-focus image provides contributions to the intermediate sum 1102.

Figure 12:
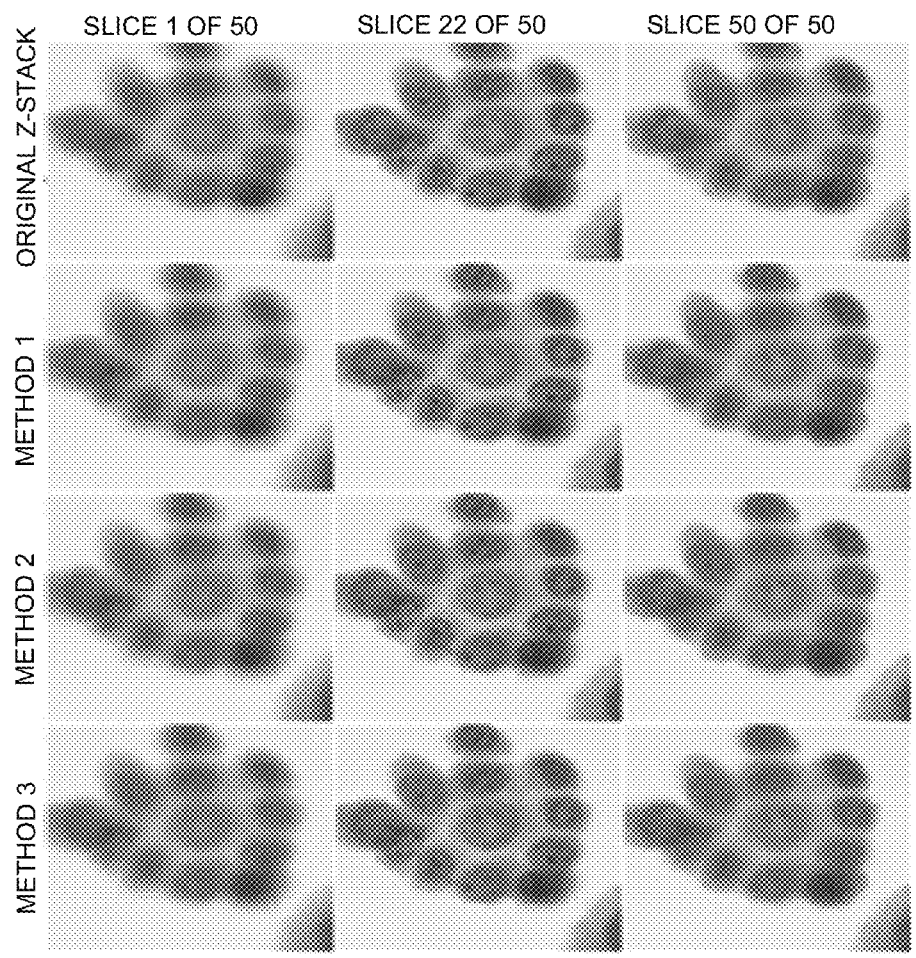
FIG. 12 depicts example results of the first, second and third simulation methods compared to the original Z-stack, in accordance with exemplary embodiments of the present invention.

FIG. 12 shows example results of the three simulation methods 500, 800 and 1000 compared to the original Z-stack. In FIG. 12, from left, center to right, the three columns show results for three different images of the 50-image data set. For purposes of illustration, the three different images selected from the 50-image data set are images 1, 22 and 50. From top to bottom, the rows show the original Z-stack, the Z-stack simulated using the BOX PSF, the iterated BOX PSF and the triangular PSF methods. The left and right columns are the two extremes of the data set, and show significant amount of out-of-focus blur, whereas in the right column, there is a small circular brown object that is in sharp focus. In the center column, there are multiple regions that are in focus and other regions that are out of focus. In all of these cases, each of the three simulation methods provide a good match with the original Z-stack, both for the in-focus regions and in the blurred out-of-focus regions.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

The invention claimed is:

1. A method for simulating depth of field (DOF) in microscopic imaging to approximate a sequence of images, the method comprising:
   computing a blur quantity for each pixel of an all-focus image;
   performing a set of operations comprising a box point spread function (PSF) operation twice on one or more regions of the all-focus image;
   computing an intermediate integral image and a normalized integral image on the regions; and
   determining each output pixel based on the intermediate integral image and the normalized integral image to produce a simulated depth of field image.

2. The method of claim 1, wherein performing the PSF operation further comprises:
   initializing an intermediate sum and a normalized sum for each pixel for each output image at all depths, and computing a blur quantity for each of the pixels for each output image,
   wherein the operations further comprise performing at least four pairs of operations on at least four corners of a box-shaped PSF and wherein the output pixel is determined as a ratio between the intermediate and normalized integral images.

3. The method of claim 1, wherein approximating the sequence of images further comprises successively performing the box function of the PSF operation in more than two iterations.

4. The method of claim 1, further comprising performing a triangle Point Spread Function (PSF) operation instead of the box point spread function operation.

5. The method of claim 4, further comprising:
   initializing an intermediate sum and a normalized sum for all values of x and y for each output image at all depths, and
   computing a blur quantity for each pixel partly based from a z-stack of images,
   wherein the set of operations further comprise performing at least nine pairs of operations on at least nine distinct positions corresponding to a triangle PSF, wherein the at least nine pairs of operations comprise a first function and a second function and wherein the output pixel is determined as a ratio between the intermediate and normalized integral images.

6. The method of claim 1 further comprising
   applying depth-dependent out-of-focus blurring to the all-focus image.

7. An apparatus for simulating depth of field (DOF) in microscopic imaging to approximate a sequence of images comprising:
   a depth of field simulation module that computes a blur quantity for each pixel of an all-focus image generated by an all-focus image generator; and
   the all-focus image generator that performs a set of operations comprising a box point spread function (PSF) operation twice on one or more regions of the all-focus image, computing an intermediate integral image and a normalized integral image on the regions and determining an output pixel for each pixel based on the intermediate integral image and the normalized integral image.

8. The apparatus of claim 7, wherein the depth of field simulation module further:
   initializes an intermediate sum and a normalized sum for each pixel for each output image at all depths, and computes a blur quantity for each pixel of the each output image,
   wherein the set of operations further comprise performing at least four pairs of operations on at least four corners of a box-shaped PSF and wherein the output pixel is determined as a ratio between the intermediate and normalized integral images.

9. The apparatus of claim 7, wherein approximating the sequence of images further comprises the depth of field simulation module successively performing the box function of the PSF in two or more iterations.

10. The apparatus of claim 7, wherein the set of operations comprise approximating the Point Spread Function (PSF) as a triangle function.

11. The apparatus of claim 10, wherein the depth of field simulation module further initializes an intermediate sum and a normalized sum for each pixel of each output image at all depths, and computes a blur quantity for each pixel,
   wherein the set of operations further comprise performing at least nine pairs of operations on at least nine distinct positions corresponding to a triangle PSF
   and wherein the output pixel is determined as a ratio between the intermediate integral image and normalized integral image.

12. The apparatus of claim 7 wherein the all focus image generator further applies depth-dependent out-of-focus blurring to the all-focus image.

13. The method of claim 5, wherein the at least nine distinct positions comprise:
   top-left, top-center, middle-left, middle-center, middle-right, bottom-left, bottom-center and bottom-right.

14. The method of claim 13, further comprising:
   computing a third function for the intermediate integral image to generate a third function integral image;
   computing a fourth function for the third function integral image;
   computing a fifth function for the integral image of the normalized sum to generate a fifth function integral image;
   computing a sixth function for the fifth function integral image; and
   computing a ratio of the fourth function to the sixth function as the output pixel, forming a simulated Z-stack image.

15. The method of claim 14, wherein the first function and the second function for the at least nine pairs of operations comprise, respectively:

$H(x-\{\sigma\}, y-\{\sigma\}) += 1/\sigma^4 I_\infty(x, y)$ and $T(x-\{\sigma\}, y-\{\sigma\}) += 1/\sigma^4$, $H(x+1, y-\{\sigma\}) -= 2/\sigma^4 I_\infty(x, y)$ and $T(x+1, y-\{\sigma\}) -= 2/\sigma^4$, $H(x+\{\sigma\}+2, y-\{\sigma\}) += 1/\sigma^4 I_\infty(x, y)$ and $T(x+\{\sigma\}+2, y-\{\sigma\}) += 1/\sigma^4$, $H(x-\{\sigma\}, y+1) -= 2/\sigma^4 I_\infty(x, y)$ and $T(x-\{\sigma\}, y+1) -= 2/\sigma^4$, $H(x+1, y+1) += 4\sigma^4 I_\infty(x, y)$ and $T(x+1, y+1) += 4/\sigma^4$, $H(x+\{\sigma\}+2, y+1) -= 2/\sigma^4 I_\infty(x, y)$ and $T(x+\{\sigma\}+2, y+1) -= 2/\sigma^4$, $H(x-\{\sigma\}, y+\{\sigma\}+2) += 1/\sigma^4 I_\infty(x, y)$ and $T(x-\{\sigma\}, y+\{\sigma\}+2) += 1/\sigma^4$, $H(x+1, y+\{\sigma\}+2) -= 2/\sigma^4 I_\infty(x, y)$ and $T(x+1, y+\{\sigma\}+2) -= 2/\sigma^4$, and $H(x+\{\sigma\}+2, y+\{\sigma\}+2) += 1\sigma^4 I_\infty(x, y)$ and $T(x+\{\sigma\}+2, y+\{\sigma\}+2) += 1/\sigma^4$, wherein x and y specify a pixel location in an all focus image, $\sigma$ is the blur quantity, $I_\infty(x, y)$ is the all-focus image, H is an intermediate sum, and T is a normalized sum.

\* \* \* \* \*